United States Patent [19]

Earley et al.

[11] 3,877,350
[45] Apr. 15, 1975

[54] PISTON AND CONNECTING ROD ASSEMBLY

[75] Inventors: Robert W. Earley, Worthington, Ohio; Delmar R. Riffe, Murrysville, Pa.

[73] Assignee: Westinghouse Electric Corporation, Pittsburgh, Pa.

[22] Filed: Nov. 29, 1973

[21] Appl. No.: 420,333

[52] U.S. Cl. .................... 92/187; 74/579 R; 74/587; 403/152
[51] Int. Cl. ............................................... F16j 1/14
[58] Field of Search ............. 74/579 R, 579 E, 587; 123/197 A, 197 AB; 92/187; 403/150, 152

[56] References Cited
UNITED STATES PATENTS

| 1,772,966 | 8/1930 | Solver | 92/187 |
| 3,245,705 | 4/1966 | Fangman | 74/579 R X |

*Primary Examiner*—Samuel Scott
*Assistant Examiner*—F. D. Shoemaker
*Attorney, Agent, or Firm*—E. C. Arenz

[57] ABSTRACT

A piston and connecting rod assembly in which the piston has a uniform diameter bore extending through the skirt from one skirt face to the other, with the lower part of the bore opening on a flared bottomed slot which accommodates the rocking of the connecting rod. An upper journal portion of a connecting rod — wrist pin assembly is received in the bore, the journal portion includes the upper end of a one-piece connecting rod having spaced apart upstanding ears at opposite sides of the upper end and a separate, generally cylindrically shaped piston pin with recessed end portions complementary in shape to the ears so that in the assembled relationship the upstanding ears and separate piston pin form the journal portion with the journal portion having a uniformly curved circumference throughout at least that portion of the journal which is presented in facing relation to the surfaces of the bore.

7 Claims, 4 Drawing Figures

PATENTED APR 1 5 1975

PISTON AND CONNECTING ROD ASSEMBLY

BACKGROUND OF THE INVENTION

1. Field of the Invention

This invention pertains to the art of piston and connecting rod assemblies for reciprocating machines such as reciprocating compressors used in refrigeration and air conditioning equipment.

2. Description of the Prior Art

In refrigerators and air conditioning equipment that utilize reciprocating type compressors as part of the cooling unit, one cause of failure of the equipment is excessive wear in the bearing areas between the piston and the connecting rod in the compressor. The bearing wear situation can be improved and the bearing life substantially increased by reducing the unit loading on the bearing surfaces and providing better lubrication to the bearing surfaces. Some examples of piston connecting rod construction and the bearing surfaces therebetween heretofore used in reciprocating machines can be found in U.S. Pat. Nos. 1,959,279; 2,027,035; 3,564,978; and foreign patents France No. 1,369,205; Great Britain No. 153,685.

The present invention is a piston and connecting rod assembly in which the bearing area between the piston and the connecting rod is significantly increased, thereby reducing the unit loading on the bearing area, and which is adapted to better receive lubrication when used in compressors currently known in the art.

SUMMARY OF THE INVENTION

In accordance with the invention, a piston and connecting rod combination includes a piston having a head and a skirt, and having a uniform diameter transverse bore extending therethrough from one skirt face to the opposite skirt face with the lower part of the bore being open for at least a part of its length onto a slot having a width at its intersection with the bore less than the diameter of the bore. The slot is defined by opposed faces which diverge in a downward direction opening on the bottom of the piston forming a space to accommodate the rocking of the connecting rod. A journal portion which is the upper end of a unitary connecting rod-wrist pin assembly is received in the bore. The upper end journal portion comprises the upper end of a one-piece rod portion having spaced apart upstanding ears at opposite sides of the upper end of the rod portion, and a separate, generally cylindrically-shaped member with recessed end portions complementary in shape to the ears so that when assembled the upstanding ears and the separate member form the journal portion. Means are provided to retain the rod and the pin assembled as a unit. The journal portion has a uniformly curved circumference throughout at least that portion which is presented in facing relation to the surfaces of the bore.

DESCRIPTION OF THE PREFERRED EMBODIMENT

Figure 1:
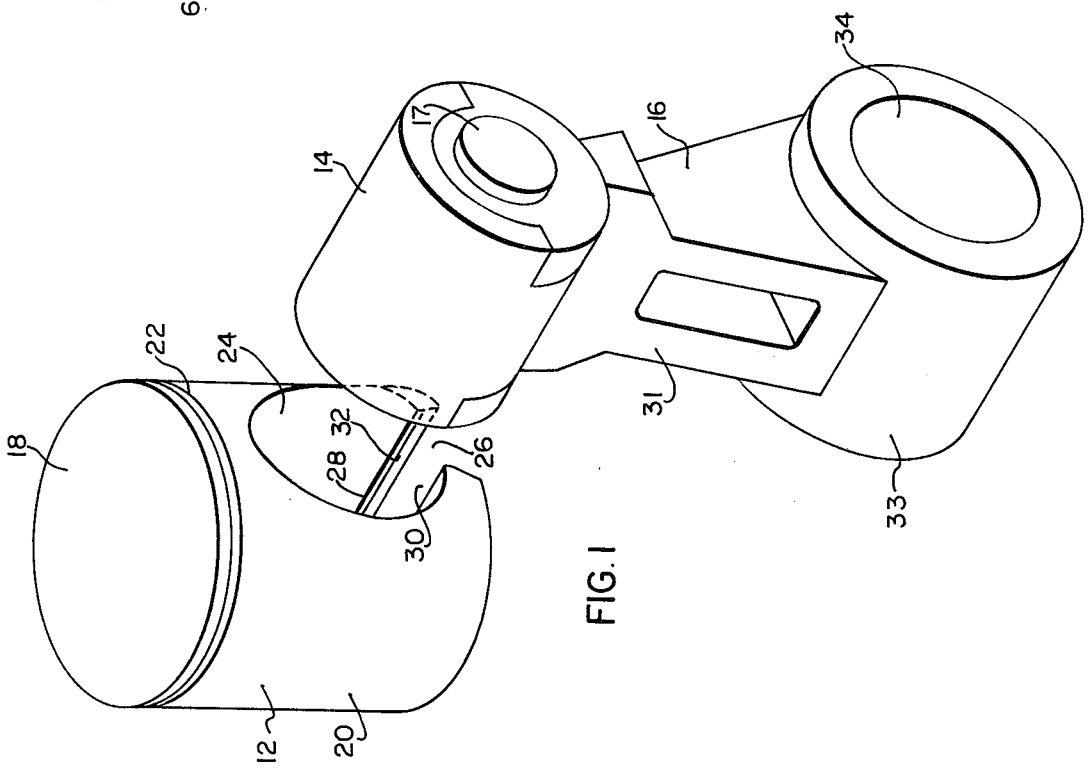
FIG. 1 is an isometric view of the combination partly assembled.

Referring to FIG. 1, the parts of the assembly include a piston 12, a cylindrical member 14, a connecting rod 16, and a retaining rod means such as a rivet 17.

The piston 12 (FIG. 1) is preferably made from a cylindrically-shaped, solid piece of metal such as an aluminum alloy, and includes a head 18, a skirt 20 and an optional annular groove 22 adapted to receive a ring, if so desired. A diametric bore 24 is drilled transversely through the piston from one skirt face to the opposite skirt face. The lower part of the bore 24 opens onto a slot 26. The width of the intersection 28 between the bore 24 and the slot 26 is less than the diameter of the bore 24 so that the upper end portion of the connecting rod 16 is retained therein after the rod and piston are assembled. The slot 26 is defined by opposed faces 30 and 32 which diverge in a downward direction to open on the bottom of the piston. The included angle between the diverging faces 30 and 32 is sufficiently large to preclude the rod 16 from interfering with the faces as the rod rocks when the piston is reciprocating. This angle therefore is in part determined by the shape of the upper end of the rod 16. The lower part of the connecting rod 16 includes a leg section 31 and a crank ring 33 for attaching the combination to a crank shaft.

The opening of the slot 26 (FIG. 1) onto the bottom of the piston provides an advantage when the assembly is used in a small reciprocating compressor. Preferably in this type of compressor, the lubrication to the piston, cylinder, and bearing surfaces between the piston and the member 14, would be pumped through passages in the crankshaft (not shown) which would pass through bore 34 in rod 16, and then be dispersed out of the end of the shaft to splash onto these surfaces and also into the air surrounding the surfaces as an oil mist to cool and to lubricate. Oil splashed onto the surfaces in the area about the slot 26 and onto the faces 30 and 32 will work its way around the bore 24 to lubricate the bearing surfaces. The oil dispersed on the cylinder wall also will work its way into bore 24 and onto these bearing surfaces by entry from the ends of the bore.

The member 14 is a compatible bearing material such as case hardened steel or hardened sintered iron when used in combination with the piston material. The connecting rod 16 preferably is a lighter material which reduces the overall mass of the connecting rod unit, providing greater efficiency and less vibration in the operation of the reciprocating machine. In the preferred embodiment the rod 16 is an aluminum alloy. The rod 16 and member 14 are retained as a unitary assembly by a rivet 17.

One preferred way of making piston 12 is to machine it from bar stock with the bore 24 drilled to be of uniform diameter throughout its length. This structure results in a relatively large bearing surface, as contrasted to convential piston and wrist pin arrangements, and is highly desirable in small reciprocating compressors for refrigerators because of the increased load capacity. Fortuitously the arrangement which yields the larger bearing surface also promotes better lubrication of the surfaces and accordingly substantially increases the life of the bearing. An alternate method of construction of the piston is to die cast the piston, with the bore cast slightly smaller than its final dimension and then machined to that dimension.

Figure 2:
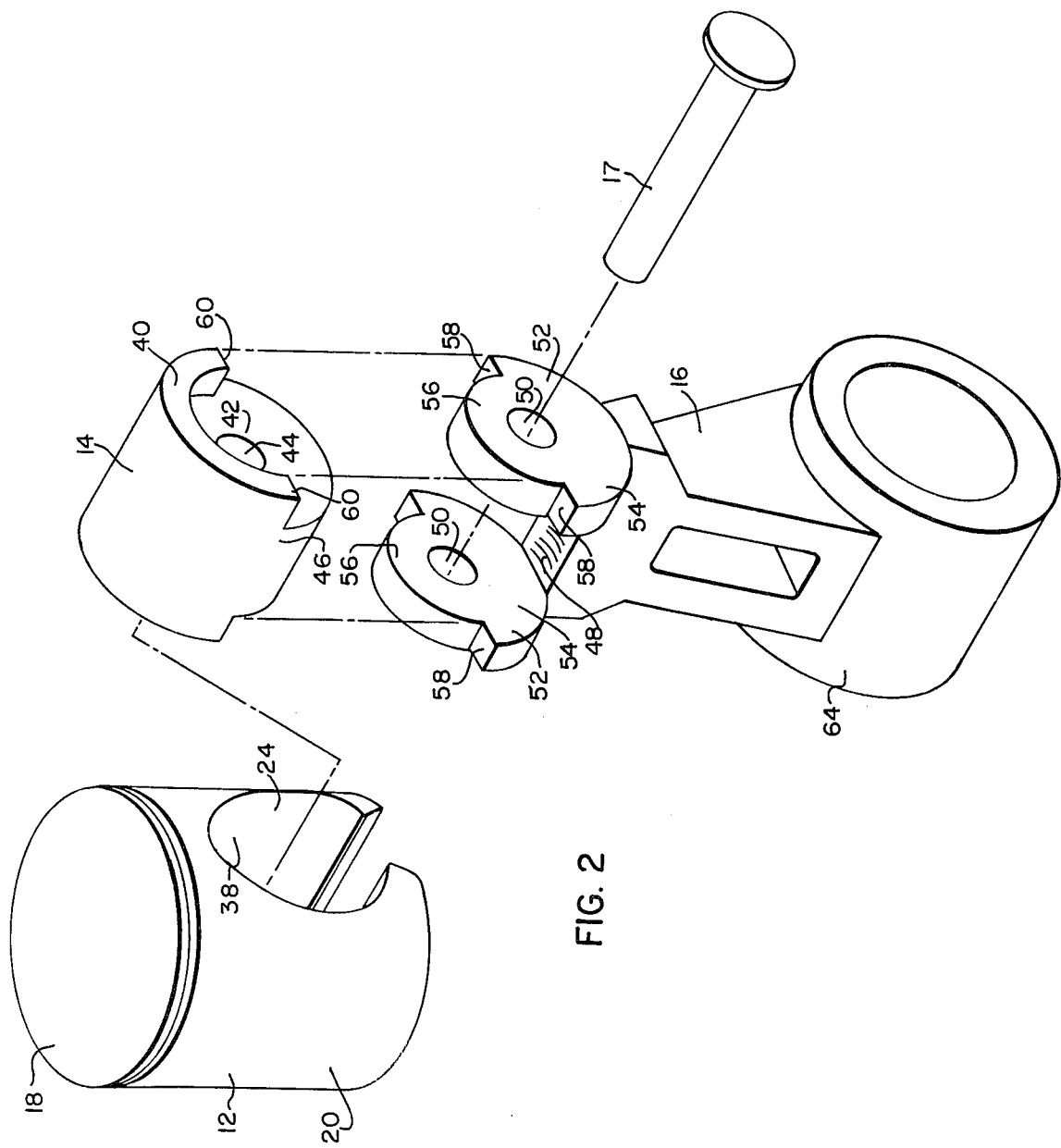
FIG. 2 is an exploded isometric view of the combination in position for assembly.

Referring to FIG. 2, the member 14 is seen apart from the rod 16. It is generally cylindrically shaped and has an outer diameter slightly smaller than that of bore 24, to provide a sliding fit therewith. Each end of member 14 has the lower part recessed to leave an upper section 40 shaped in a half-ring extending beyond the recessed ends 42. A bore 44 is drilled through the center of the member 14, which is sized so that when it is assembled with the connecting rod 16, the bottom of the member body 46, can abut the complementary shaped carriage surface 48 on the connecting rod, and with the piston pin bore 44 in registry with similar bores 50 in the upstanding ears 52 of the connecting rod to accept the rivet 17 therethrough. The inside faces of the ears 52 (FIG. 2) are spaced slightly in excess of the length of the body 46 of the piston pin so that the body can be slidably received therebetween. The profile of each ear is made to be complementarily received in the recessed ends 42 of the piston pin. In the preferred embodiment, the profile comprises a lower half 54 having an outer diameter equal to that of the outer diameter of the piston pin, and an upper half 56 having a circular shape with a radius generally equal to the inner radius of the extended upper sections 40 of the piston pin so that these upper sections 40 encircle the upper halves 56 in the assembled relationship. At the level of the plane between the upper and lower halves of each ear, there are shoulders to receive in abutting relation the ends 60 of the upper sections 40 of the piston pin in the assembled relationship. The upper sections 40 are made to encircle the upper halves 56 of the ears in order to increase the effective bearing area of the relatively harder piston pin by the amount each ear is overlapped by each upper section. In the preferred embodiment, the upper sections 40 have a semi-circular shape extending generally 180° which is the maximum these sections can extend and still be able to be slipped over the upper halves 56.

Figure 3:
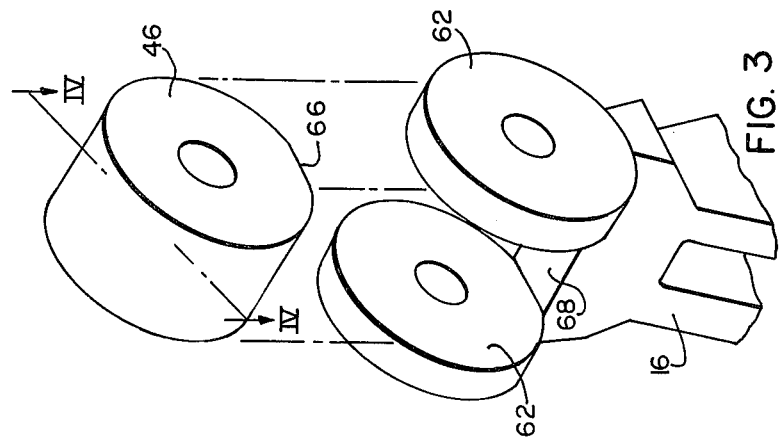
FIG. 3 is an exploded isometric view showing an alternate connecting rod and wrist pin construction.

However, in alternate constructions, the upper sections could be made as any part of an arc less than 180° or as shown in FIG. 3, the sections are removed completely. In this construction the uprights 62 have a diameter smaller then the diameter of the bearing pin body 46 so that the uprights do not contact the piston bore since these parts could be made from materials incompatible for bearing relation.

Figure 4:
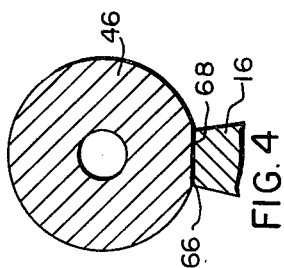
FIG. 4 is a sectional view of the construction of FIG. 3 but in the assembled relation and corresponding to one taken along line IV—IV of FIG. 3.

FIG. 3 also shows an alternate construction of the connecting rod piston pin unit wherein the bottom 66 of the piston pin body 46 has a flat surface along its length. The carriage surface 68 of the connecting rod has been similarly flattened so that in the assembled relationship as shown in FIG. 4 the flat surface of the pin rests on the flattened surface of the carriage area.

This arrangement allows the loading on member 46 to be directly transfered to the rod 16 without being applied to the rivet 17. It also reduces the tendency of the member 46 to rotate with respect to the connecting rod 16.

What we claim is:

1. The combination of the piston and connecting rod comprising:

a piston having a head, a skirt, and a bottom end, and having a uniform diameter bore extending therethrough from one skirt face to the opposite skirt face with the lower part of the bore being open along its length to a generally trough-shaped space which is downwardly open and is defined by outwardly flaring walls extending to said bottom end of said piston; and a connecting rod—wrist pin assembly including an upper end journal portion to be received in said bore, said upper end journal portion comprising a one piece rod portion having spaced apart upstanding ears at opposite sides of the upper end of said rod portion, and a separate, generally cylindrically-shaped piece with recessed end portions complementary in shape to said ears so that as assembled said upstanding ears and said separate piece form said journal portion, with the journal portion having a uniformly curved circumference throughout at least that portion of the journal portion which is presented in facing relation to the surfaces of said bore, and means for retaining said rod portion and said separate piece in assembled relation.

2. The combination of a piston and connecting rod comprising:

a piston having a head and a skirt, and having a uniform diameter transverse bore extending therethrough from one skirt face to the opposite skirt face with the lower part of said bore being open for at least a part of its length onto a slot having a width at its intersection with said bore less than the diameter of said bore, said slot being defined by opposed faces which diverge in a downward direction to form a space to accommodate rocking of said rod;

a connecting rod—wrist pin assembly including an upper end journal portion to be received in said bore, said upper end journal portion comprising the upper end of a one-piece rod portion having spaced apart upstanding ears at opposite sides of said upper end of said rod portion, and a separate, generally cylindrically-shaped member with recessed end portions complementary in shape to said ears so that as assembled said upstanding ears and said separate member form said journal portion, with said journal portion having a uniformly curved circumference throughout at least that portion which is presented in facing relation to the surfaces of said bore, and;

means for retaining said rod portion and said separate member in assembled relation.

3. The combination of claim 2, wherein:

each of said upstanding ears has a profile including, a lower part shaped as at least a half ring having an outer diameter equal to that of said wrist pin, and an upper part having an outer diameter smaller than said lower part and substantially equal to the diameter of said recessed end portion with a shoulder transition therebetween and a bore through the common center of both parts.

4. The combination of claim 2, wherein:

said means for retaining said rod portion and said separate member in assembled relation comprises rod means extending longitudinally through said separate member and said ears.

5. The combination of a piston and connecting rod comprising:

a piston having a head, a skirt, and a bottom end and having a uniform diameter bore extending therethrough from one skirt face to the opposite skirt face with the lower part of the bore being open along at least a major part of its length to a generally trough-shaped space which is downwardly open and is defined by outwardly flaring walls extending to said bottom end of said piston; and a connecting rod — wrist pin assembly including an upper clevis part comprising two spaced-apart, opposing uprights on the upper end of said rod, and a separate bearing pin, at least a part of said bearing pin being retained in the space between said uprights, said bearing pin having a uniform curved circumference throughout at least that portion which is in facing relation to the surfaces of said bore when said clevis part and said pin are received within said bore in the assembled relationship, and means for retaining said clevis part and said separate bearing pin in assembled relationship.

6. The combination of claim 5 including:

means for preventing said bearing pin from rotating with respect to said clevis part.

7. The combination of claim 6, wherein:

said means for preventing said bearing pin from rotating comprises a flat surface on said bearing pin and an opposing flat carriage surface on said clevis part.

* * * * *